United States Patent Office 3,491,122
Patented Jan. 20, 1970

1

3,491,122
SYNTHESIS OF 4-PYRONES

Alfred A. Schleppnik, St. Louis, and Marvin L. Oftedahl, Crestwood, Mo., assignors to Monsanto Company, St. Louis, Mo., a corporation of Delaware No Drawing. Filed Sept. 14, 1966, Ser. No. 579,225
Int. Cl. C07d *7/16*; C07c *49/24*
U.S. Cl. 260—345.9 8 Claims

ABSTRACT OF THE DISCLOSURE

Preparation of 2-alkyl-3-hydroxy-4-pyrones by (a) the reaction of a hydroxy or unsaturated ketone with a formate ester, (b) cyclization in an acid medium of the product; (c) oxidizing the cyclized product to give the 4-pyrone.

This invention relates to a new process for the preparation of dihydro-4-pyrones and 4-pyrones. More specifically, this invention is concerned with the preparation of 2-alkyl-2,3-dihydro-4-pyrones, maltol and related compounds.

Maltol, 2-methyl-3-hydroxy-4-pyrone, is well known for its usefulness as a flavor enhancer in food products and various beverages including breads, cakes, pies, candies, coffee and the like. It is also used as an ingredient in perfumes and essences.

Until recently maltol had been obtained by extraction from natural products, such as bark, or by destructive distillation of wood, or by a synthetic route utilizing kofic acid, 2-hydroxymethyl-5-hydroxy-4-pyrone, which is a product obtained in fermentation processes.

In these processes, expensive purification of the intermediate or the final product is required to eliminate the many by-products which are present in minute amounts in natural products and which impart a disagreeable odor or taste to the final product.

It is therefore an object of this invention to provide a process for the preparation of dihydro-4-pyrones and 4-pyrones which eliminate the above disadvantages.

It is a further object of this invention to provide a novel synthetic method of preparing dihydro-4-pyrones and 4-pyrones.

It is a further object of this invention to prepare 2-alkyl-2,3-dihydro-4-pyrones and 2-alkyl-3-hydroxy-4-pyrones.

It is a more specific object of this invention to prepare maltol, 2-methyl-3-hydroxy-4-pyrone and 2-methyl-2-3-dihydro-4-pyrones.

Further objects, aspects and advantages of the invention will be apparent from the description which follows.

Briefly, this invention provides a process for the preparation of 2-alkyl-3-hydroxy-4-pyrones by a synthetic chemical process utilizing commercially available compounds. This invention also provides a novel cyclization process for the preparation of dihydro-4-pyrones which in turn is converted to the 4-pyrone. The dihydro-4-pyrone intermediates formed during the synthesis of the 4-pyrones are new and valuable compounds for the synthesis of maltol and other heterocyclic compounds.

Synthesis of alkyl-3-hydroxy-4-pyrones according to

2 this invention, follows the following sequence of reactions:

(1)

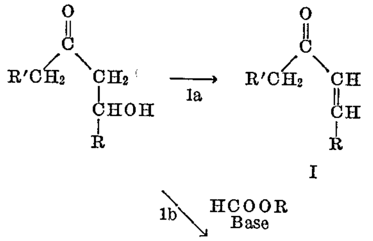

I (2)

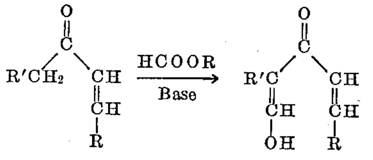

I II (3)

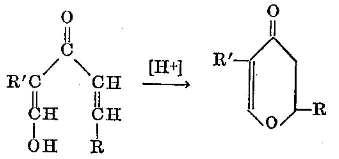

II III (4)

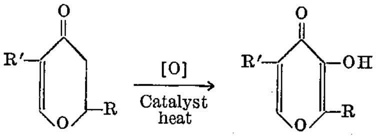

III IV wherein R is hydrogen or an alkyl group having a maximum of 4 carbon atoms and R′ is a hydrogen, alkyl or aryl group.

The synthesis may be started from either step (1) or (2), that is from either the β-hydroxyketone or the alkenone compound. When the β-hydroxyketone is utilized as the starting compound the reaction may not go through the intermediate alkenone (path 1*a*) as illustrated, but instead may proceed directly to the formylated compound (path 1*b*) which would indicate that formylation may have occurred first followed by dehydration. In either event, the intermediate (I) is not isolated and the reaction proceeds to the intermediate (II), 1-hydroxyalka-1,4-dien-3-one.

Preparation of both types of starting compounds is by a condensation reaction in which a ketone and an aldehyde are condensed, usually in a basic medium, to give either the β-hydroxyketone or the alkenone. β-hydroxyketones are readily dehydrated to the alkenone compound according to conventional methods. For example, the condensation of acetone with acetaldehyde leads to the formation of 4-hydroxypentan-2-one or pent-3-ene-2-one, which are the starting compounds for the formation of maltol. Other useful ketone and aldehydes include methyl ethyl ketone, diethyleketone, ethyl propyl ketone, dipropyl ketone, acetaldehyde, propionaldehyde, n-butyraldehyde, isobutyraldehyde and the like. Many of these condensation compounds are commercially available.

The reaction of a β-hydroxyketone or alkenone with a formate ester in a basic medium gives 1-hydroxyalka-1,4-diene-3-ones. This compound exists in its metal enolate form in the basic medium and does not have to be isolated prior to cylization to 2,3-dihydro-4-pyrones.

The formylation reaction is temperature dependent and is dependent upon the starting component. Although the formylation reaction can be run at temperatures up to 50° C., competitive reactions occur at the higher temperatures decreasing the yield of 1-hydroxyalka-1,4-diene-3-one.

Alkenone compounds are very reactive due to the conjugated system of the carbonyl and the ethylenic linkage. The compounds tend to polymerize in either acidic or basic medium, increasing in rate as the temperature increases. Since formylation reactions are run in basic medium, it has been found desirable to keep the reaction temperatures to temperatures below about 0° C. and preferably below about −5 to −25° C. When the alkenone is used as the starting compound above 0° C., the competitive polymerization reaction increases lowering the yield of the desired formylated compound.

When β-hydroxyketone is utilized as the starting compound, competitive polymerization or condensation reactions are not as prevalent as in the alkenone starting material, obviating the need of keeping the reaction temperature low. The reaction is, however, still temperature dependent in that the rate of formylation decreases as the temperature decreases. It is desirable to formylate the β-hydroxyketone at temperatures ranging from 10 to 50° C. and preferably about 10 to 30° C.

Base catalysts for the formylation reactions is usually a metal alkoxide, although other basic materials such as sodium metal and the like may be used.

The order of addition of components has been found to affect the yield of the formylation reaction. Low yields, probably due to polycondensation of the ketone, were obtained when the ketone and formate ester were added together to the catalyst. This was increased by a formation of a catalyst-ester complex from the base and formate ester prior to the addition of the ketone to the reaction mixture. This procedure increases the base concentration in the reaction mixture and therefore increases the formylation reaction of the ketone as opposed to polycondensation of the ketone.

Reverse addition of the base-ester complex to a ketone solution has been unsuccessful even at low temperatures of 0–40° C. which would normally lead to polycondensation of the ketone.

Solvent for the reaction is any organic solvent which would not interfere with the reaction with any component or product thereof. Ether, hydrocarbons and aromatic hydrocarbons have been used successfully.

Alcohols, with this specific limitation, can be used as a solvent. There is a possibility of addition to the ethylenic linkage of the alkenone under the conditions of the formylation reaction. This possibility decreases as the alcohol chain length increases. In addition, the alcohol solvent may interchange with the ester moiety, releasing a lower alcohol to the reaction system, which would in turn add to the ethylenic linkage. When alcohol is used as the solvent, it would be preferable to use the same alkyl moiety in both the ester and alcohol to avoid these side reactions. These side reactions are not critical when the β-hydroxyketones is used as the starting component and therefore alcohols may be used as the solvent.

The reaction of ketone with formate ester involves the addition of the α-methylene group to the carbonyl carbon of the ester with a subsequent elimination of the alcohol moiety of the formate, forming a 1,3-diketone which, in the basic medium, exists mainly as the enolate. Although other carboxylic esters react in the same manner, only the formate ester gives the desired hydroxy derivative. The alcohol moiety of the formate ester which has a maximum of 8 carbon atoms is not important and includes, among others, methyl, ethyl, propyl and butyl. n-Butyl formate is preferred with alkenones and methyl formate, which is the most reactive formate, with β-hydroxyketones.

Having formed the intermediate 1-hydroxyalka-1,4-diene-3-one, in its metal enolate form, the compound is cyclized by acidification, usually without isolation, to 2,3-dihydro-4-pyrones. The reaction medium is acidified to a pH of about 2 with a strong acid which can be either organic or inorganic, such as mineral acid. Cooling of the reaction mixture during acidification is required to maintain the temperature below about 50° C.

The reaction medium must be sufficiently acidic to prevent hydrogen bridge formation between the hydroxy group and the carbonyl oxygen. In a strongly acidic medium, protonation of the carbonyl oxygen from the medium occurs preferentially, freeing the hydroxy group permitting cyclization to the dihydro-4-pyrone. Concentrated sulfuric acid and hydrochloric acid are examples of sufficiently strong protonic donors that are capable of protonating the carbonyl oxygen.

Following acidification and cyclization, the mixture is filtered and the filtrate concentrated under reduced pressure. The residue is then triturated with hot ether, filtered, solvent removed and the residue fractionally distilled to yield the 2,3-dihydro-4-pyrone. Structure of the dihydropyrone was confirmed by infrared spectra, absorption bands appearing at [illegible] cm.[-1] of the conjugated carbonyl double bond stretching vibration.

Oxidation of the dihydro-4-pyrone to the 4-pyrone is carried out in an inert solvent in the presence of a catalyst and at elevated temperatures.

The solvent must be inert to oxidation and preferentially have a boiling point at the reaction temperature in the approximate range of 80–175° C. Solvents which are inert to oxidation and are usable in the temperature range of 80–175° C. are well known in the art, including such classes of compounds as carboxylic acids, hydrocarbons, chlorinated hydrocarbons, aromatic hydrocarbons and the like. Representative compounds within these classes include acetic and propionic acids, chlorobenzene and o-dichlorobenzene.

Dihydro-4-pyrone is converted to 4-pyrone by oxidation at elevated temperatures. Air or other free oxygen-containing gas is passed through the hot solution for a sufficient time to convert the dihydro compound to 4-pyrone. The time required for oxidation varies depending upon the rate of flow, concentration of oxygen in the gas, amount of compound to be oxidized and temperature of reaction.

Reaction temperatures should be maintained between 80 and 175° C. Below 80° C., the reaction proceeds too slowly for the process to be practical. Above 175° C., the deleterious side reactions are possible which lead to a decrease in yield of the product, 2-n-butyl-[illegible]-4-pyrone. Optimum oxidizing conditions were found to exist when the reaction temperature was maintained at about [illegible]° C.

In order for the oxidation to proceed at a practical rate, a catalyst was added to the reaction medium. Cobalt salts, bromides, and mixtures thereof have been found to exert a catalytic effect on the reaction. Examples of cobalt salts which have been shown to exhibit a catalytic effect are cobalt acetate hydrate, the cobalt salts of carboxylic acids, such as cobalt propionate, cobalt butyrate and cobalt 2-ethylhexanoate, and cobalt salts of inorganic acids such as cobalt bromide. The bromide ion may be in combination with any metal or as an acid component, such as sodium bromide, potassium bromide, magnesium bromide, cobalt bromide and hydrobromic acid. The above list is not meant to be exhaustive and other cobalt and bromide salts which exert a catalytic effect will be apparent to those skilled in the art.

A specific embodiment of the above generalized process is to react 4-hydroxypentan-2-one or pent-3-ene-2-one with a formate ester in a basic medium at a temperature below 50° C. to form 1-hydroxyhexa-1,4-diene-3-one (II, R=$CH_3$). This intermediate is cyclized in a strongly acidic medium, having a pH of at least 3, and at a temperature below 50° C. to yield 2-methyl-2,3-dihydro-4-pyrone (III, R=$CH_3$). Oxidation of the dihydropyrone (III) with oxygen, in the presence of a cobalt or bromide catalyst at a temperature of 80 to 175° C. forms 2-methyl-3-hydroxy-4-pyrone, Maltol (IV, R=$CH_3$).

The following examples are illustrative only of the invention and should not be construed as limiting the invention:

EXAMPLE 1

Preparation of the starting compound, alk-3-ene-2-one, is according to the conventional methods for crossed condensation reactions.

3520 ml. acetaldehyde was added over a 75-minute period to a mixture of 9000 ml. of acetone, 2760 ml. of water and 247 ml. of 0.2 N sodium hydroxide. The temperature of the reaction mixture was maintained at 50–55° C. throughout the acetaldehyde addition. Additional 0.2 N sodium hydroxide was added, during the addition of acetaldehyde, to maintain a pH of 8.0 to 9.0. To maintain the desired basicity, an additional 150 to 240 ml. of 0.2 N sodium hydroxide was required. Upon completion of the acetaldehyde addition, the temperature was maintained at 50–55° C. for an additional hour after which the reaction mixture was neutralized with 8–12 g. of oxalic acid. Excess acetone was removed by distillation from the reaction mixture until a pot temperature of 95–105° C. was obtained. The residue was cooled and 170 ml. of 50% aqueous sulfuric acid added. Distillation was resumed and the ketone-water azeotrope collected until a pot temperature of 145° C. was obtained. The aqueous layer was extracted with 3–1000 ml. portions of benzene and the benzene combined with the organic phase. Fractionation of the organic phase, after removal of the benzene, yielded 67% 3-pentene-2-one product (90% minimum purity) based on acetaldehyde. Further purification yields 3-pentene-2-one, B.P. 120–122° C.

EXAMPLE 2

Preparation of pentane-4-ol-2-one is through a crossed aldol condensation.

An amount of 132 g. of acetaldehyde was added with stirring over a 3 hour period to a mixture of 880 ml. of acetone and 12 ml. of 3 N methanolic potassium hydroxide solution maintained at 10° C. Additional methanolic potassium hydroxide was added during the course of the reactions to maintain a pH of 8.0 to 9.0. After completion of addition, the reaction mixture was stirred an additional 30 minutes and then neutralized with 3 N methanolic oxalic acid. Solids which precipitated from the solution were removed by filtration and the filtrate distilled to remove the methanol and excess acetone. Distillation was continued until a pot temperature of 110° C. was reached. The residue was then fractionally distilled under reduced pressure to yield a product, B.P. 72–105° C./25–35 mm., which was a mixture of 4-pentanol-2-one and diacetone alcohol. Further purification yielded 4-pentanol-2-one, B.P. 62–64° C./12 mm.

EXAMPLE 3

The 4-pentanol-2-one prepared in Example 2 can be used as the starting compound in the synthesis of maltol or it may be dehydrated to 3-pentene-2-one.

Ketoalcohol mixture (543.8 g.), obtained in Example 2, was added dropwise to 0.5 g. of concentrated sulfuric acid and the product flash distilled. The volume of ketoalchol in the distillation flask was maintained at 50 ml. throughout the course of the distillation. Benzene (100 ml.) was added to the distillate and the water layer which separates was removed. The water layer was saturated with sodium sulfate and extracted with 30 ml. of benzene which was combined with the organic phase. Azeotropic distillation removed the last traces of water and benzene. Fractional distillation of the residue yielded a product containing 86% 3-pentene-2-one which was further purified to give 3-pentene-2-one B.P. 120–122° C.

EXAMPLE 4

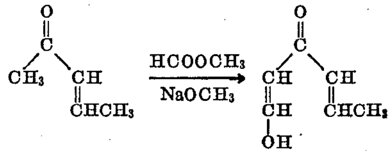

II

To a slurry of 16.2 g. (0.3 mole) of sodium methoxide in 100 ml. of dry benzene was added with stirring 36.0 g. (0.6 mole) of methyl formate. A thick gel of the ester complex formed, which was chilled to −10° C. Pent-3-ene-2-one (25.8 g., 0.3 mole) was added to the gel with vigorous stirring at a rate which maintained the temperature at −10° C. or below. The ester complex slowly dissolved, turning the reaction mixture yellow. A final light tan solution was obtained upon completion of addition. The solution was stirred for an additional hour at −10° C., one hour at 0° C. and then gradually warmed to room temperatures. Concentration of the mixture under reduced pressure yielded the sodium enolate salt of 1-hydroxyhexa-1,4-diene-3-one (II). Identity of the compound was demonstrated by converting to the 1-acetoxy derivative by reaction with excess acetic anhydride. This derivative had an infra-red spectrum very similar to 4-acetoxybut-3-ene-2-one.

EXAMPLE 5

The procedure of Example 4 was repeated using n-butyl formate in place of methyl formate to give the sodium enolate salt of 1-hydroxyhexa-1,4-diene-3-one.

EXAMPLE 6

The procedure of Example 4 was repeated using diethyl ether as solvent in place of dry benzene.

EXAMPLE 7

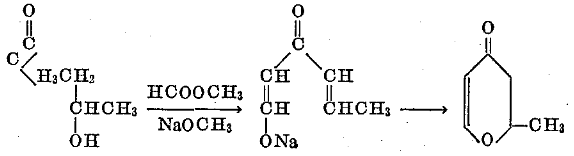

II III

To a solution of 32.4 g. (0.6 mole) of sodium methoxide in 150 ml. of anhydrous methanol was added 36.0 g. (0.6 mole) of methyl formate. Pentane-4-ol-2-one (30.6 g., 0.3 mole) was added dropwise with stirring and cooling. The temperature during the addition was maintained below 30° C. Upon completion of addition the reaction mixture was stirred overnight at room temperature. The mixture was acidified to pH 2 with concentrated sulfuric acid, in a dropwise addition, maintaining the temperature below 30° C. during the acidification. Upon completion of the acidification, the mixture was filtered, neutralized and the filtrate concentrated under reduced pressure. The residue, which was a solid and an oil, was triturated with dry ether, filtered and the filtrate concentrated to yield 24.8 g. of a brown liquid residue. Fractional distillation of this residue yielded a fraction, B.P. 28–95° C./1 mm., containing the desired 2-methyl-2,3-dihydro-4-pyrone. Structure was confirmed by infra-red absorption bands at 1695, 1645, 1618 and 1570 $cm^{-1}$.

EXAMPLE 8

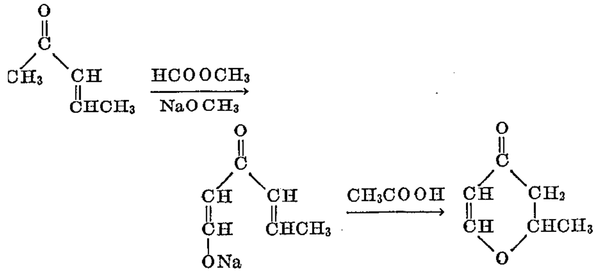

To a solution of 25.2 g. (0.3 mole) of pent-3-ene-2-one in 50 ml. of diethyl ether, at —5° C., was added dropwise with stirring a solution of 32.4 g. (0.6 mole) of sodium methoxide and 18.0 g. (0.3 mole) of methyl formate in 120 ml. of diethyl ether at a rate which maintained the temperature at about —5° C. throughout the addition. Upon completion of the addition, the reaction mixture was stirred one hour at 0° C. and ½ hour at 10° C. The mixture was then acidified, dropwise, with concentrated sulfuric acid to a pH of 3, maintaining a temperature below 25° C. during the addition. Upon completion of acidification, the mixture was filtered and the filtrate concentrated under slightly reduced pressure. The residue was redissolved in ether, neutralized, washed with water, dried and concentrated. This residue was fractionally distilled yielding a fraction, B.P. 40–95° C./1 mm., containing the desired 2-methyl-2,3-dihydro-4-pyrone. Structure confirmed by infra-red absorption bands at 1695, 1645, 1618 and 1570 $cm.^{-1}$.

EXAMPLE 9

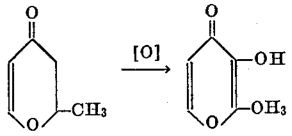

III IV

Air was bubbled through a solution of 11.1 g. (0.1 mole) of 2-methyl-2,3-dihydro-4-pyrone (III) in 40 ml. of acetic acid, to which had been added a catalytic amount of cobalt bromide, at a rate of 0.7 to 1.0 c.f.m. for 3 hours. The reaction temperature was maintained at about 130° C. throughout the oxidation. Upon completion of the reaction, the mixture was cooled and the solvent removed by distillation depositing solid maltol which, on recrystallization from ethanol, was a white solid M.P. 163–164° C.

While the illustrative embodiments of the invention have been described hereinbefore with particularity, it will be understood that various other modifications will be apparent to and can readily be made by those skilled in the art without departing from the scope and spirit of the invention. Accordingly, it is not intended that the scope of the claims appended hereto be limited to the examples and description set forth herein but rather the claims be construed as encompassing all the features of patentable novelty which reside in the present invention including all features which would be treated as equivalents thereof by those skilled in the art to which the invention pertains. In the appended claims each step of the process is identified by a letter. The same process step is identified by the same letter in each claim.

What is claimed is:

1. A process for preparing 2-alkyl-3-hydroxy-4-pyrones which comprises:

(a) reacting a compound having the following formula:

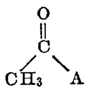

in which A is selected from the group consisting of —CH=CHR′ and $—CH_2CH(OH)R′$ wherein R′ is an alkyl group having a maximum of 4 carbon atoms, with an alkyl formate said alkyl having a maximum of eight carbon atoms in a basic medium at a temperature below about 50° C. to form an intermediate compound having the following formula:

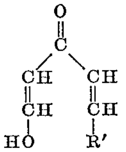

wherein R′ has the same meaning as above, (b) treating said intermediate with an acid at a temperature below about 50° C. and at a pH below about 3 [3.5,] to form an intermediate having the following formula:

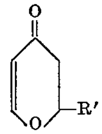

wherein R′ has the same meaning as above, (c) heating said intermediate in an oxidizing medium comprising an oxygen-containing gas, a catalyst selected from the group consisting of cobalt salts, bromide ions, and mixtures thereof and an inert solvent, at a temperature in the range of about 80 to 175° C., to form a compound having the following formula:

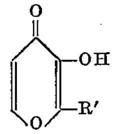

wherein R′ has the same meaning as above.

2. A process in accordance with claim 1 wherein:

(a) said compound has the following formula

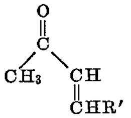

wherein R′ has the same meaning as above, said alkyl formate having an alkyl group having a maximum of 8 carbon atoms and said basic medium comprises a metal alkoxide and an inert solvent, (b) said acid is a mineral acid, (c) said inert solvent is selected from the group consisting of carboxylic acids, chlorinated hydrocarbons and aromatic hydrocarbons and said catalyst is selected from the group consisting of cobalt acetate hydrate, cobalt proprionate, cobalt butyrate, cobalt 2-ethylhexanoate, cobalt bromide, hydrogen bromide, sodium bromide and potassium bromide.

3. A process in accordance with claim 2 wherein:

(a) said alkyl formate is selected from the group consisting of methyl formate, ethyl formate, propyl formate and butyl formate, said metal alkoxide is selected from the group consisting of sodium methoxide, sodium ethoxide and sodium propionate and said inert solvent is selected from the group consisting of aliphatic ethers, alcohols, alkanes and aromatic hydrocarbons, (b) said mineral acid is sulfuric acid, (c) said oxygen-containing gas is air.

4. A process in accordance with claim 3, wherein;

(a) said compound has the following formula:

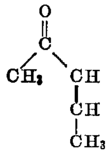

said alkyl formate is methyl formate, said metal alkoxide is sodium methoxide, said temperature is below about 0° C. and said inert solvent is benzene, (b) said pH is below about 2.5, (c) said oxidizing medium consists of acetic acid and cobalt bromide and said temperature is about 130° C.

5. A process in accordance with claim 1, wherein:

(a) said compound has the following formula:

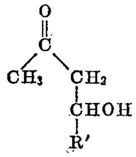

wherein R′ has the same meaning as above, said inert solvent is a primary alcohol having a maximum of 8 carbon atoms.

6. A process in accordance with claim 5, wherein:

(a) said compound has the following formula:

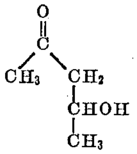

said temperature is below about 30° C. and said primary alcohol is methanol.

7. 2-alkyl-2,3-dihydro-4-pyrone wherein said alkyl group has a maximum of 4 carbon atoms.

8. 2-methyl-2,3-dihydro-4-pyrone.

References Cited

Chemical Abstracts, vol. 55, p. 1598.

Houben-Weyl, Methoden der Organischen Chemie (1966), vol. 6/4, pp. 18–21.

NORMA S. MILESTONE, Primary Examiner

U.S. Cl. X.R.

260—594